United States Patent
Hong et al.

(10) Patent No.: US 11,632,477 B2
(45) Date of Patent: Apr. 18, 2023

(54) METHOD FOR PHOTOGRAPHING AND READING AN IMAGE, AND APPARATUS THEREFOR

(71) Applicant: SAMSUNG SDS CO., LTD., Seoul (KR)

(72) Inventors: Min Ki Hong, Seoul (KR); Chang Hyun Park, Seoul (KR); Do Yeon Kim, Seoul (KR); Se Hyeon Park, Seoul (KR); Kwan Sik Yoon, Seoul (KR); Sol Bi Hwang, Seoul (KR); Jae Hyeon Lee, Seoul (KR); Yong Hyun Jeong, Seoul (KR); Hyun Chul Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/980,085

(22) Filed: Nov. 3, 2022

(65) Prior Publication Data
US 2023/0049014 A1 Feb. 16, 2023

Related U.S. Application Data

(62) Division of application No. 17/078,400, filed on Oct. 23, 2020, now Pat. No. 11,526,974.

(30) Foreign Application Priority Data

Jun. 2, 2020 (KR) .......................... 10-2020-0066714

(51) Int. Cl.
*H04N 1/00* (2006.01)
*G06T 7/00* (2017.01)
(Continued)

(52) U.S. Cl.
CPC ......... *H04N 1/00244* (2013.01); *G06F 18/24* (2023.01); *G06T 7/0002* (2013.01);
(Continued)

(58) Field of Classification Search
CPC ......... G06T 7/0002; G06T 2207/20021; G06T 2207/10016; G06T 2207/10148; G06T 2207/20084; G06K 9/6267; G06K 9/6201; H04N 1/00209; H04N 1/00244; H04N 5/232; H04N 5/23212; H04N 5/232133; H04N 5/232127; H04N 5/232125; H04N 5/23229; H04N 5/2356; H04N 5/23218;
(Continued)

(56) References Cited

U.S. PATENT DOCUMENTS 9,148,582 B2 * 9/2015 Nestares .............. H04N 23/743
9,451,150 B2 * 9/2016 Shibagami ........... H04N 23/635
(Continued)

*Primary Examiner* — Michael S Osinski
(74) *Attorney, Agent, or Firm* — The PL Law Group, PLLC

(57) ABSTRACT

An apparatus for reading an image executes operations including receiving a plurality of images for a same subject from a photographing device, obtaining a screen division value related to the plurality of images, checking focused sections of the plurality of images based on the obtained screen division value, and determining type of the plurality of images based on a result of checking the focused sections. According to the apparatus, it can be determined whether an image is actually photographed without a separate ToF module.

10 Claims, 10 Drawing Sheets

(51) Int. Cl.
  *G06F 18/24* (2023.01)
  *H04N 23/60* (2023.01)
  *G06V 10/75* (2022.01)
  *G06V 10/764* (2022.01)

(52) U.S. Cl.
  CPC ............ *G06V 10/75* (2022.01); *G06V 10/764* (2022.01); *H04N 1/00209* (2013.01); *H04N 23/60* (2023.01); *G06T 2207/20021* (2013.01)

(58) Field of Classification Search
  CPC ......... H04N 5/232945; H04N 5/23216; H04N 5/23296; H04N 5/232123; H04N 5/2353; H04N 5/23219; H04N 5/23245; H04N 5/36961; G06V 10/75; G06V 10/764; G03B 13/36
  See application file for complete search history.

(56) References Cited

U.S. PATENT DOCUMENTS

| | | | | |
|---|---|---|---|---|
| 9,516,237 | B1* | 12/2016 | Goyal | H04N 25/533 |
| 9,549,125 | B1* | 1/2017 | Goyal | H04N 23/661 |
| 9,615,019 | B2* | 4/2017 | Funamoto | G03B 13/36 |
| 9,709,922 | B2* | 7/2017 | Narita | G03G 15/0856 |
| 10,129,456 | B1* | 11/2018 | Kim | G06T 7/13 |
| 10,467,490 | B2* | 11/2019 | He | H04L 63/0861 |
| 11,025,862 | B1* | 6/2021 | Lee | H04N 7/142 |
| 2008/0170847 | A1* | 7/2008 | Flannery | H04N 23/75 396/222 |
| 2009/0015681 | A1* | 1/2009 | Pipkorn | H04N 23/959 348/E5.045 |
| 2009/0059057 | A1* | 3/2009 | Long | H04N 23/951 348/343 |
| 2009/0268079 | A1* | 10/2009 | Motomura | H04N 5/772 375/E7.076 |
| 2014/0176783 | A1* | 6/2014 | Shibagami | H04N 23/673 348/349 |
| 2015/0035855 | A1* | 2/2015 | Kim | H04N 23/67 345/619 |
| 2015/0085179 | A1* | 3/2015 | Van Heugten | H04N 23/673 348/349 |
| 2015/0199098 | A1* | 7/2015 | Park | H04N 23/635 715/790 |
| 2016/0266348 | A1* | 9/2016 | Narayanan | G02B 7/36 |
| 2016/0309089 | A1* | 10/2016 | Hongu | H04N 23/61 |
| 2017/0034421 | A1* | 2/2017 | Yamazaki | H04N 23/80 |
| 2017/0272658 | A1* | 9/2017 | Ito | H04N 23/55 |
| 2017/0339332 | A1* | 11/2017 | Kano | H04N 23/611 |
| 2017/0366743 | A1* | 12/2017 | Park | G06F 3/04883 |
| 2018/0075617 | A1* | 3/2018 | Abe | G06T 5/50 |
| 2018/0176453 | A1* | 6/2018 | Yamazaki | G02B 7/34 |
| 2018/0302552 | A1* | 10/2018 | Shionoya | H04N 25/58 |
| 2018/0336688 | A1* | 11/2018 | Narita | G06T 7/194 |
| 2019/0246034 | A1* | 8/2019 | Watanabe | H04N 23/64 |
| 2020/0013146 | A1* | 1/2020 | Yasuda | H04N 23/69 |
| 2020/0051476 | A1* | 2/2020 | Huang | G09G 3/3208 |
| 2020/0410204 | A1* | 12/2020 | Echigo | G01N 33/4833 |
| 2021/0006701 | A1* | 1/2021 | Sakurabu | G03B 13/36 |
| 2021/0067683 | A1* | 3/2021 | Azou | H04N 23/61 |
| 2021/0075972 | A1* | 3/2021 | Fukugawa | G06V 10/764 |
| 2021/0103749 | A1* | 4/2021 | Aragon | G06T 7/90 |
| 2021/0203856 | A1* | 7/2021 | Hirose | H04N 23/611 |

* cited by examiner

METHOD FOR PHOTOGRAPHING AND READING AN IMAGE, AND APPARATUS THEREFOR

CROSS-REFERENCE TO RELATED APPLICATION AND CLAIM OF PRIORITY

The present application is a divisional application of U.S. patent application Ser. No. 17/078,400, filed Oct. 23, 2020, which claims priority to Korean Patent Applications No. 10-2020-0066714 filed on Jun. 2, 2020, in the Korean Intellectual Property Office, the entire disclosures of which are incorporated by reference herein.

BACKGROUND

1. Field

The disclosure relates to a method for photographing and reading an image, and an apparatus therefor. In more detail, it relates to a method for photographing and reading an image capable of reading whether a subject is a realistic image or a processed image, and an apparatus therefor.

2. Description of the Related Art

There is a ToF (Time-of-Flight) technology that uses a difference in reflection time of light rays as a photographing means for obtaining 3-dimensional distance information of a subject. The ToF technology calculates distance information from the subject by illuminating a laser or infrared light on a subject and calculating the time difference, in which the reflected light is received. The ToF technology is widely used for collecting real-time depth information of moving objects such as 3D object recognition technology since it can obtain depth information (i.e., distance information between the camera and the subject) in units of image pixels of a CCD (Charge-Coupled Device) camera. Recently, it is also widely used to read whether an image of photographing a subject is a realistic image or a re-photographed image of another image.

For example, if the depth information contained in each pixel of the photographed image is different for each pixel and shows the overall three-dimensional depth information, the image must be a realistic image of photographing the actual subject, but if the depth information of each pixel is the same or changes flat, the image is likely to be a processed image of re-photographing an existing photo or video. According to this method, it is easy to determine whether or not a photographed image is a realistic image, so it can be widely used in various cases where it is important to determine whether the image is authentic such as on-site image verification for insurance payment, the authenticity determination of the image submitted as evidence in court, or verification of broadcaster press releases.

However, there is a problem that an expensive ToF module must be separately installed in the camera in order to apply the ToF technology, and it is difficult to utilize due to a large measurement error in an outdoor environment with interference from other light rays.

Accordingly, there is a need for a new method of technology that can check whether it is a realistic image, and does not require a separate ToF module and can be applied even in an outdoor environment.

SUMMARY

The technical problem to be solved through some embodiments of the disclosure is to provide an image photographing and reading method capable of reading whether the photographed image is a realistic image of photographing an actual object or a processed image of re-photographing an existing photograph and image, and an apparatus therefor.

Another technical problem to be solved through some embodiments of the disclosure is to provide an image photographing and reading method, capable of reading whether an image is actually photographed without having a separate ToF module, and an apparatus therefor.

Another technical problem to be solved through some embodiments of the disclosure is to provide an image photographing and reading method capable of reading whether an image is actually photographed, which is applicable to an outdoor environment, and an apparatus therefor.

The technical problems of the disclosure are not limited to the technical problems mentioned above, and other technical problems that are not mentioned will be clearly understood by those skilled in the art from the following description.

According to an embodiment of the disclosure, a method for photographing an image is performed by a computer device, the method includes obtaining a screen division value for photographing an image, classifying a photographing screen into a plurality of sections based on the screen division value, photographing a first image by focusing a first section among the plurality of sections, photographing a second image by focusing a second section among the plurality of sections, and transmitting the first image and the second image to a server.

According to an embodiment of the disclosure, a method for photographing an image is performed by a computer device, the method includes obtaining a screen division value for photographing an image, classifying a photographing screen into a plurality of sections based on the screen division value, photographing a first image by focusing a first section among the plurality of sections, and transmitting the first image to a server, wherein the server checks a focused section of the first image to determine a type of the first image.

According to an embodiment of the disclosure, an apparatus for photographing an image includes a processor, a memory for loading a computer program executed by the processor, and a storage for storing the computer program, wherein the computer program includes instructions for executing operations including obtaining a screen division value for photographing an image, classifying a photographing screen into a plurality of sections based on the screen division value, photographing a first image by focusing a first section among the plurality of sections, photographing a second image by focusing a second section among the plurality of sections, and transmitting the first image and the second image to a server.

According to an embodiment of the disclosure, an apparatus for photographing an image includes a processor, a memory for loading a computer program executed by the processor, and a storage for storing the computer program, wherein the computer program includes instructions for executing operations including receiving a plurality of image for the same object, obtaining a screen division value related to the plurality of image, checking a focused section of the plurality of image based on the screen division value, and determining type of the plurality of image based on a result of checking the focused section.

DETAILED DESCRIPTION

Figure 1:
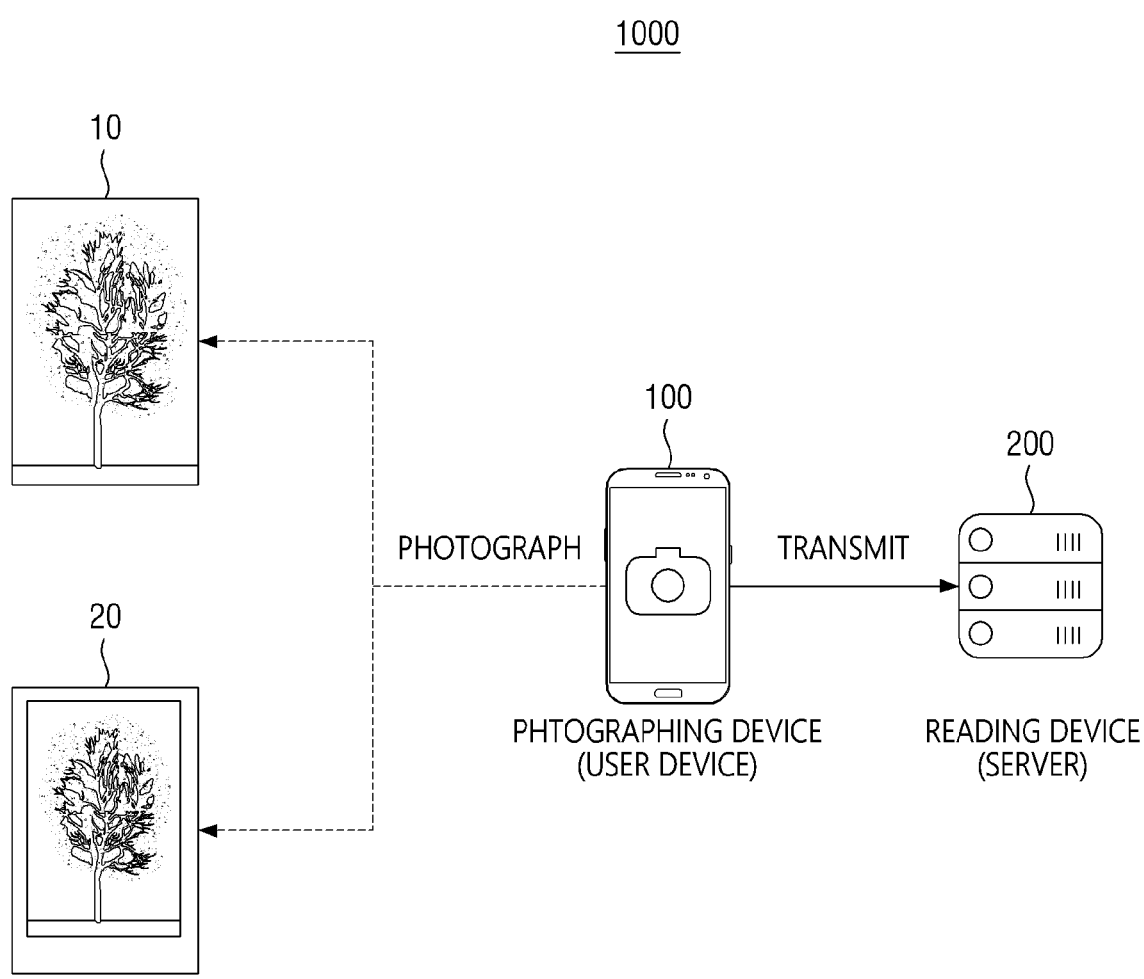
FIG. 1 is a diagram for conceptually describing an image photographing and reading method according to the disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram for conceptually describing an image photographing and reading method according to the disclosure.

In the system environment 1000 illustrated in FIG. 1, the photographing device 100 (e.g., a user device) photographs the subjects 10 and 20 using a built-in camera. The subject 10 and 20 to be photographed may be an object 10 that actually exists, or may be an existing photographed photo or video screen 20. Hereinafter, a subject that is an actual existing object will be referred to as a 3-dimensional subject, and a subject that is an existing photographed photo or video screen will be referred to as a 2-dimensional subject.

At this time, in order to read whether the photographed image is a 3-dimensional subject image or a 2-dimensional subject image, the photographing device 100 photographs several images by varying focus points for the same subject. Several images photographed in this way will be referred to as multi-focus images. A detailed description of the multi-focus image and its photographing method will be described later in detail in or below FIG. 2, and thus a detailed description thereof is omitted.

Then, the photographing device 100 transmits the multi-focus image to the reading device 200 (e.g., a server) at a time of synchronization with the reading device 200 after storing the multi-focus image.

The reading device 200 analyzes the transmitted multi-focus image and determines/reads the type of the image whether the image is a 3-dimensional subject image or a 2-dimensional subject image. For example, if the previously photographed subject is a 3-dimensional subject 10, an image, in which different portions are focused whenever the focus point varies, is photographed. For example, when the focus point is the background, an image, in which the background is clear but the tree is blurred, is photographed, and when the focus point is the tree, an image, in which the tree is clear but the background is blurred, is photographed. On the other hand, if the previously photographed subject is the 2-dimensional subject 20, an image without a significant difference in the focused portion will be photographed even if the focus point varies. That is, in the case of the 2-dimensional subject 20, regardless of whether the focus point is a background or a tree, since the distance (or depth) from the photographing device 100 is the same, an image, in which both the background and the tree have the same sharpness (that is, similar to an existing photographed photo or video), will be photographed.

With this principle, the reading device 200 analyzes the multi-focus image, and if its focused portions are different from each other, the reading device 200 reads the corresponding image as a 3-dimensional subject image photographing the 3-dimensional subject 10. Conversely, the reading device 200 analyzes the multi-focus image, and if the focused portions thereof are the same or similar to each other, the reading device 200 reads the corresponding image as a 2-dimensional subject image photographing the 2-dimensional subject 20.

As an embodiment, in this case, the reading device 200 may determine/read the type of the multi-focus image by further referring to the focused area or the focused order of the focused portions. This will be described in more detail in or below FIG. 2.

According to the method of the disclosure as described above, it is possible to easily read whether re-photographing a previously photographed photo or video screen and submitting a processed image by manipulating, forging or altering it as if it is actually photographed. If the focused portions of the multi-focus image are the same or similar to each other, it can be known as photographing a 2-dimensional subject, indicating that the actual object was not photographed.

Figure 2:
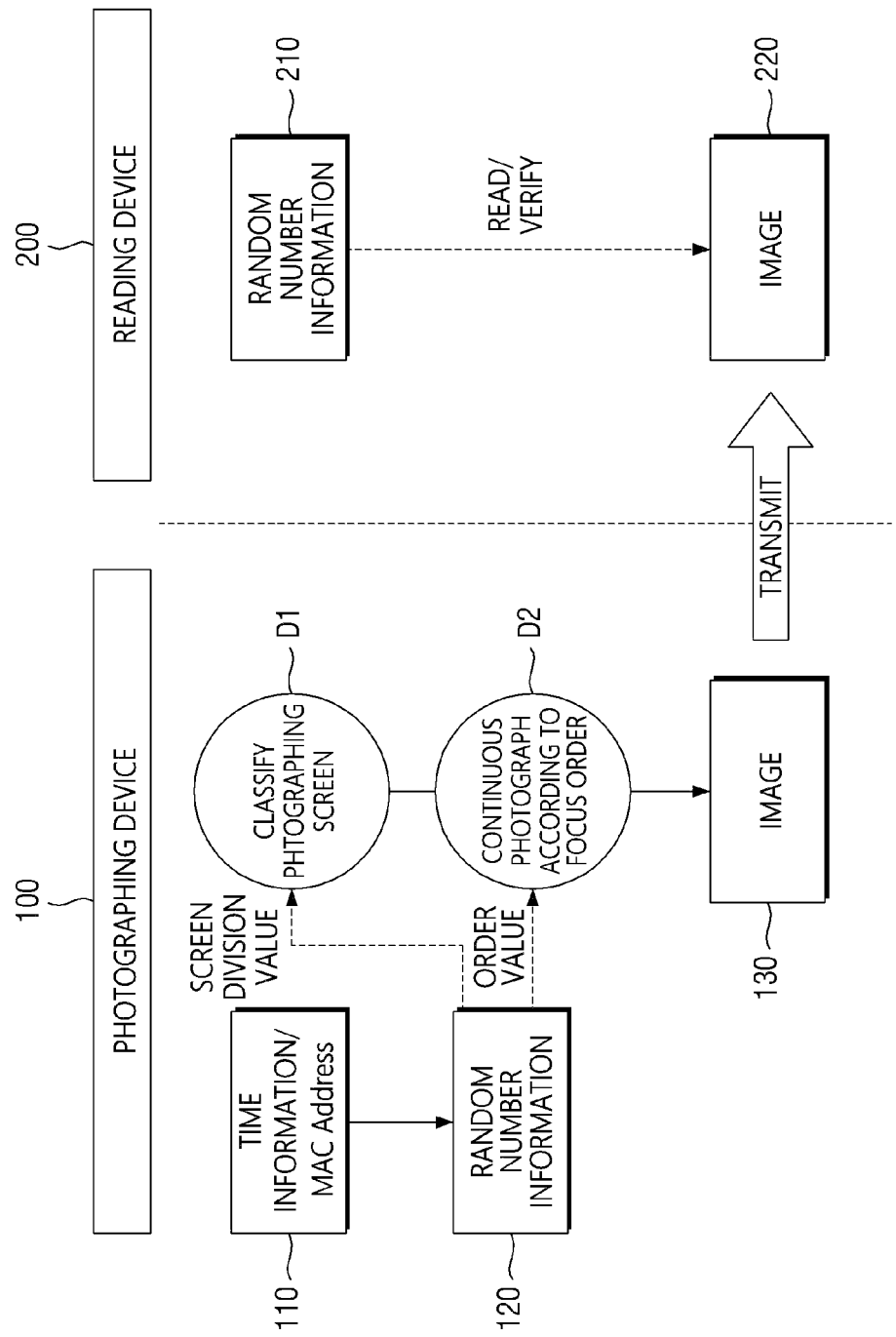
FIG. 2 is a block diagram illustrating a specific method of photographing a multi-focus image through the photographing device 100 and the reading device 200 illustrated in FIG. 1 and reading whether it is a realistic image based thereon.

FIG. 2 is a block diagram illustrating a specific method of photographing a multi-focus image through the photographing device 100 and the reading device 200 illustrated in FIG. 1 and reading whether it is a realistic image based thereon. In the embodiment of FIG. 2, a method of dividing a screen to classify an area to be multi-focused and photographing and reading a multi-focus image by considering a focus order of the classified area is described. It will be described below with reference to the drawing.

First, the photographing device 100 generates random number information 120 according to a predetermined rule. As an embodiment, the random number information 120 may be generated based on the time information and the MAC address 110 of the photographing device 100.

In order to share the random number information 120 with the reading device 200, the photographing device 100 generates random number information 120 using a predetermined random number generation algorithm. In this case, the random number generation algorithm may be an algorithm that receives time information when generating random number information 120 and the MAC address of the photographing device 100 generating random number information 120 as an input factor so that different random number information is generated according to a time of photographing a multi-focus image and a photographing device. Random number generation algorithms for generating random numbers based on specific input factors have various types, and their technical contents are also widely known in the art, and thus detailed descriptions thereof will be omitted here.

The generated random number information 120 may include a screen division value referenced to divide and classify a photographing screen when multi-focus photographing, and an order value that designates a focus order of each divided and classified screen area.

The photographing device 100 classifies the photographing screen into a plurality of areas according to the screen division value among the random number information 120 (D1). For example, if the screen division value is 3, the photographing device 100 classifies the photographing screen into three areas. Similarly, if the screen division value is 9, the photographing device 100 classifies the photographing screen into nine areas. Subsequently, when multi-focus photographing, the photographing device 100 focuses the subject based on each of the classified areas.

Next, the photographing device 100 selectively focuses the classified areas according to an order value among the random number information 120 to continuously photograph the subject (D2). For example, assuming that there are three areas classified by the screen division value, and an order value is assigned as a vector value of [3, 2, 1] to the classified area, the subject is photographed by focusing on the third area, to which the order value '1' is assigned, first among the classified areas and then, the same subject is repeatedly photographed by focusing on the second area, to which the order value '2' is assigned, among the classified areas. Finally, the same subject is repeatedly photographed by focusing on the third area, to which the order value '3' is assigned, among the classified areas. In this way, the same subject is repeatedly continuous photographed according to the order value.

Further, the photographing device 100 stores a plurality of images generated through such multi-focus photographing as a multi-focus image 130. In the above example, since three continuous photographing would have occurred by varying the focus point according to the order value [3, 2, 1], the multi-focus image 130 will be composed of a total of three images.

Meanwhile, although it is exemplified that multi-focus photographing is performed once for each classified area, the scope of the disclosure is not limited thereto. For example, assuming that there are nine areas classified by the screen division value, and an order value is assigned to the classified areas as a vector value of [3, 0, 0, 2, 0, 0, 1, 0, 0], only three continuous photographing will occur by focusing on the 7th area, the 4th area, and the first area sequentially. Multi-focus photography is not performed in the 2nd, 3rd, 5th, 6th, 8th, and 9th areas, to which the order value '0' is assigned. Accordingly, in this example, the photographing screen is divided and classified into nine areas, but only three images will be generated as the multi-focus image 130.

Thereafter, the photographing device 100 communicates with the reading device 200 and transmits the stored multi-focus image 130 to the reading device 200. At this time, the photographing device 100 transmits the previously obtained time information and the MAC address 110 to the reading apparatus 200 together to generate random number information in the reading device 200.

As an embodiment, in this case, the photographing devices 100 can pack each image according to the photographed order and transmit it to the reading device 200 so that the reading device 200 can check the photographed order of each of the images included in the multi-focus image.

Alternatively, as an embodiment, the photographing device 100 can transmit the multi-focus image together with information indicating the photographed order of each image to the reading device 200 so that the reading device 200 can check the photographed order of each of the images included in the multi-focus image.

The reading device 200 receives the transmitted multi-focus image 220 and checks the time information and the MAC address 110 transmitted together with the multi-focus image 220. Then, based on the checked time information and the MAC address 110, the random number information 210 for reading the multi-focus image 220 is generated. In this case, the reading device 200 may generate the random number information 210 by inputting the checked time information and the MAC address 110 as input factors to the same random number generation algorithm previously used by the photographing device 100. Since the same input factor is input to the same random number generation algorithm, the resultant random number information 210 will also output the same value as the random number information 120 of the photographing device 100.

Further, the reading device 200 determines/reads the type of the transmitted multi-focus image 220 by referring to the screen division value and the order value included in the random number information 210.

Specifically, the reading device 200 refers to the screen division value among the random number information 210 and checks whether the focused area of the multi-focus image matches it. If the screen division value and the focused area of the multi-focus image do not match each other (for example, an area other than the area classified according to the screen division value is focused, or two or more of the areas classified according to the screen division value are simultaneously focused), multi-focus photographing is not performed according to a predetermined method, so the reading device 200 can determine/read the type of the multi-focus image 220 as a 2-dimensional subject image or a forged or altered image.

Further, the reading device 200 refers to the order value of the random number information 210 and checks whether the focused order of the multi-focus image matches it. If the order value and the focused order of the multi-focus image do not match each other (for example, the order value indicates to focus on the third area of the classified areas first, but in the actual multi-focus image, the first area is focused first), this is also not multi-focus photography performed according to a predetermined method, so the reading device 200 can determine/read the type of the multi-focus image 220 as a 2-dimensional subject image or forged or altered image.

On the other hand, if the focused area of the multi-focus image matches the screen division value and the order value of the random number information 210, respectively, the reading device 200 can consider that the multi-focus photographing has been performed according to a predetermined method, and determine/read the type of the multi-focus image 220 as a 3-dimensional subject image or a realistic image.

Figure 3:
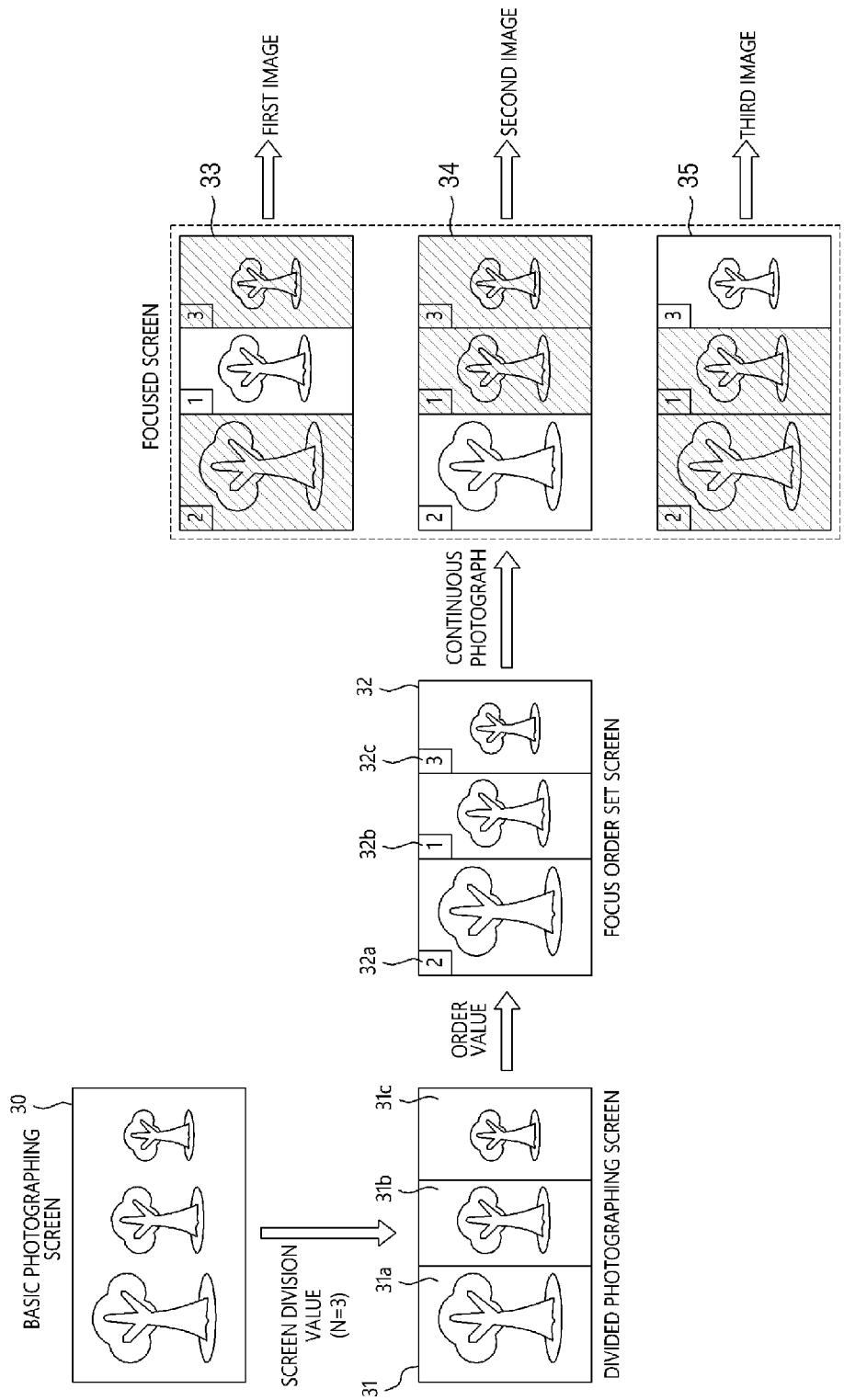
FIG. 3 is a diagram for further describing a multi-focus image and a photographing method thereof mentioned in FIG. 2.

FIG. 3 is a diagram for specifically describing a multi-focus image and a photographing method thereof mentioned in FIG. 2. In the exemplary embodiment of FIG. 3, multi-focus photography when the screen division value is 3 and the order value is [2, 1, 3] is exemplary described.

Referring to FIG. 3, a basic photographing screen 30 is shown first. This is, for example, a display screen of the photographing device 100 and represents an initial photographing screen before starting multi-focus photographing. The basic photographing screen 30 displays three trees as subjects.

Thereafter, the photographing device 100 obtains random number information, and extracts a screen division value therefrom. The screen division value at this time is illustrated as 3 (N=3). And, the photographing device 100 classifies the basic photographing screen 30 into a plurality of areas according to the screen division value. In the middle part of FIG. 3, the photographic screen 31, in which the entire screen is divided and classified into a plurality of areas 31a, 31b, and 31c, is shown.

Then, the photographing device 100 sets a focus order for each of the classified areas 31a, 31b, and 31c according to the order value of the random number information. In the center of FIG. 3, a screen 32, in which focus orders 32a, 32b, and 32c are set for each classified area, is shown. In the embodiment of FIG. 3, it is exemplified that the focus order is set as '2' for the first area, '1' for the second area, and '3' for the third area among a plurality of classified areas.

Further, the photographing device 100 performs continuous photographing according to the focus order 32a, 32b, and 32c set for each of the classified areas 31a, 31b, and 31c. Specifically, the photographing device 110 firstly focuses on the second area, in which the focus order is '1,' and photographs three trees, which are subjects. In FIG. 3, the non-focused area is indicated by hatching to distinguish it from the focused area. The result of performing the first multi-focus photography in this way is generated as the first image. Then, the photographing device 110 repeatedly photographs three trees that are the same subject, by focusing on the first area, in which the focus order is '2.' As before, the second multi-focus photographing result is generated as a second image. In addition, the photographing device 110 finally focuses on the third area, in which the focus order is '3', and repeatedly photographs three trees that are the same subjects. Similarly, the third multi-focus photographing result is generated as a third image.

When all multi-focus photographing according to the order value is completed, the photographing device 100 packs and stores the generated images (first to third images) as a multi-focus image.

Figure 4:
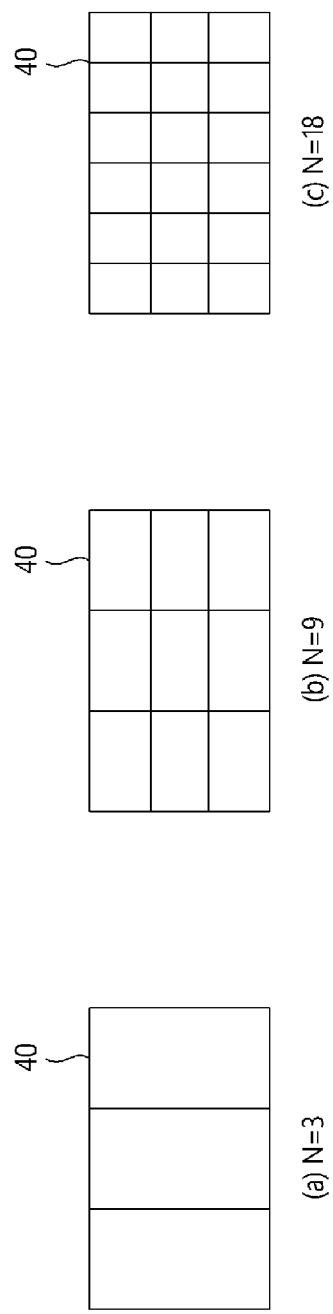
FIG. 4 is a diagram describing examples of screen classification according to various screen division values with specific examples.

FIG. 4 is a diagram describing examples of screen classification according to various screen division values with specific examples. It will be described below with reference to the drawings.

(a) of FIG. 4 is a case where the screen division value is 3 (N=3), and as in the embodiment of FIG. 3 above, the entire photographing screen is classified into three areas. Here, a case of vertically dividing the entire screen is illustrated, but the disclosure is not limited thereto, and horizontal division is also possible.

(b) of FIG. 4 is a case where the screen division value is 9 (N=9), and the entire photographing screen is classified into nine areas. As the most basic method, as illustrated, the entire screen may be equally divided into nine areas, but the disclosure is not limited thereto. For example, it is also possible to divide some areas into relatively larger areas.

(c) of FIG. 4 is a case where the screen division value is 18 (N=18), and the entire photographing screen is classified into 18 areas. As in (b) of FIG. 4, an example of equal division is illustrated here, but is not limited thereto, and it is also possible to divide some areas into relatively larger areas or smaller areas.

Meanwhile, FIG. 4 illustrates various cases of screen division as an example, and it is obvious to those skilled in the art that various screen division methods not described here (for example, when the screen division value is 3000, or when the screen division area is a triangle, etc.) can be modified and applied.

Figure 5:
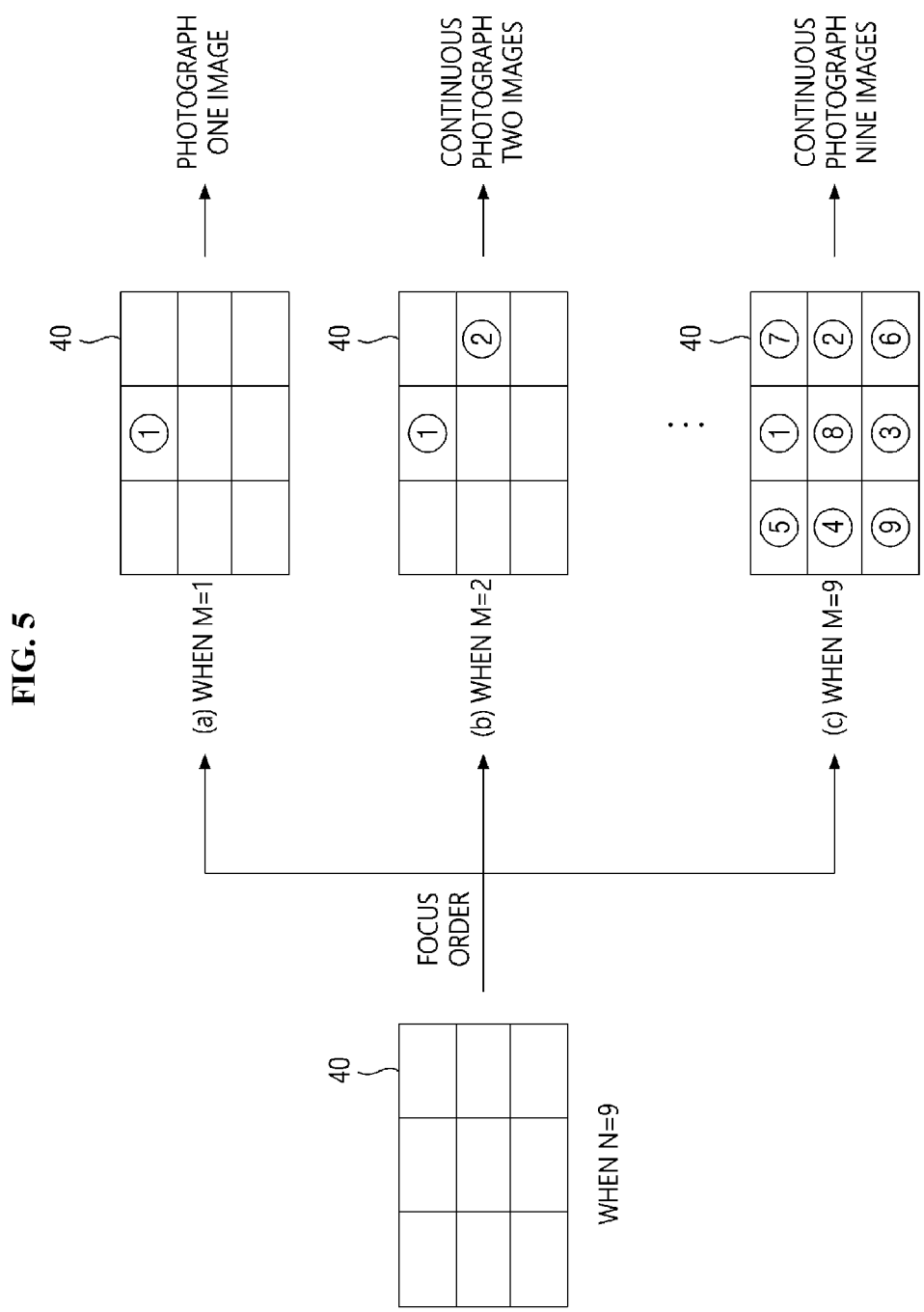
FIG. 5 is a diagram describing examples of setting a photographing order according to various order values with specific examples.

FIG. 5 is a diagram illustrating examples of setting a photographing order according to various order values with specific examples. The embodiment of FIG. 5 is described by exemplifying a case where the screen division value is 9 (N=9) for the sake of clarity.

(a) of FIG. 5 illustrates a case, in which only one image is multi-focus photographed. Since a single image is photographed, it is somewhat different from the meaning of multi-focus, but for the sake of unity of the term, the term multi-focus is used in this case as well. Since one image is photographed, an order value of '1' is set for only one area of the nine classified areas. Here, it is illustrated that the order value '1' is set in the second area. When multi-focus photographing starts, the photographing device 100 checks the classified areas according to the screen division value, focuses the second area among them, and photographs one image. As an embodiment, in this case, the total order value extracted from the random number information 120 may be a vector value such as [0, 1, 0, 0, 0, 0, 0, 0, 0].

(b) of FIG. 5 illustrates a case, in which two images are multi-focus photographed. Since two images are photographed, order values of '1' and '2' are set for two areas of the nine classified areas. Here, it is illustrated that the order value '1' is set in the second area, and the order value '2' is set in the 6th area. When multi-focus photographing starts, the photographing device 100 checks the classified area according to the screen division value, first focuses on the second area to photograph one image, and then focuses on the 6th area to photograph one image again. As an embodiment, in this case, the total order value extracted from the random number information 120 may be a vector value such as [0, 1, 0, 0, 0, 2, 0, 0, 0].

(c) of FIG. 5 is a case, in which nine images are multi-focus photographed. In the case of photographing nine images, an order value of '1' to '9' is set for each of the nine classified areas. When multi-focus photographing starts, the photographing device 100 checks the classified areas according to the screen division value, and sequentially focuses the nine areas according to the order values shown in (c) of FIG. 5 to continuously photograph nine images. As an embodiment, in this case, the total order value extracted from the random number information 120 may be a vector value such as [5, 1, 7, 4, 8, 2, 9, 3, 6].

As described above, if the photographing screen is classified into a plurality of areas and a multi-focus photographing order is designated for that, security from external hacking, malicious forgery or altercation can be greatly improved.

For example, when the screen division value is 9 and three images are multi-focus photographed, the number of multi-focus images that can be generated therefrom is nine to the power of three. Therefore, even if an externally maliciously manipulating and submitting a multi-focus image, the probability of matching the correct screen division value and order value (i.e., the probability of reading it as a realistic image) is low at 0.13%, and thus it is possible to filter out forged and altered images with a very high probability. Such security increases as the screen division value and the number of images to be photographed increase. For example, if the screen division value is 18 and the number of images to be multi-focus photographed is five, the probability of erroneously reading the manipulated image as a realistic image is extremely low to 1/1,889,569, which is obtained by dividing one with eighteen to the power of five.

Figure 6:
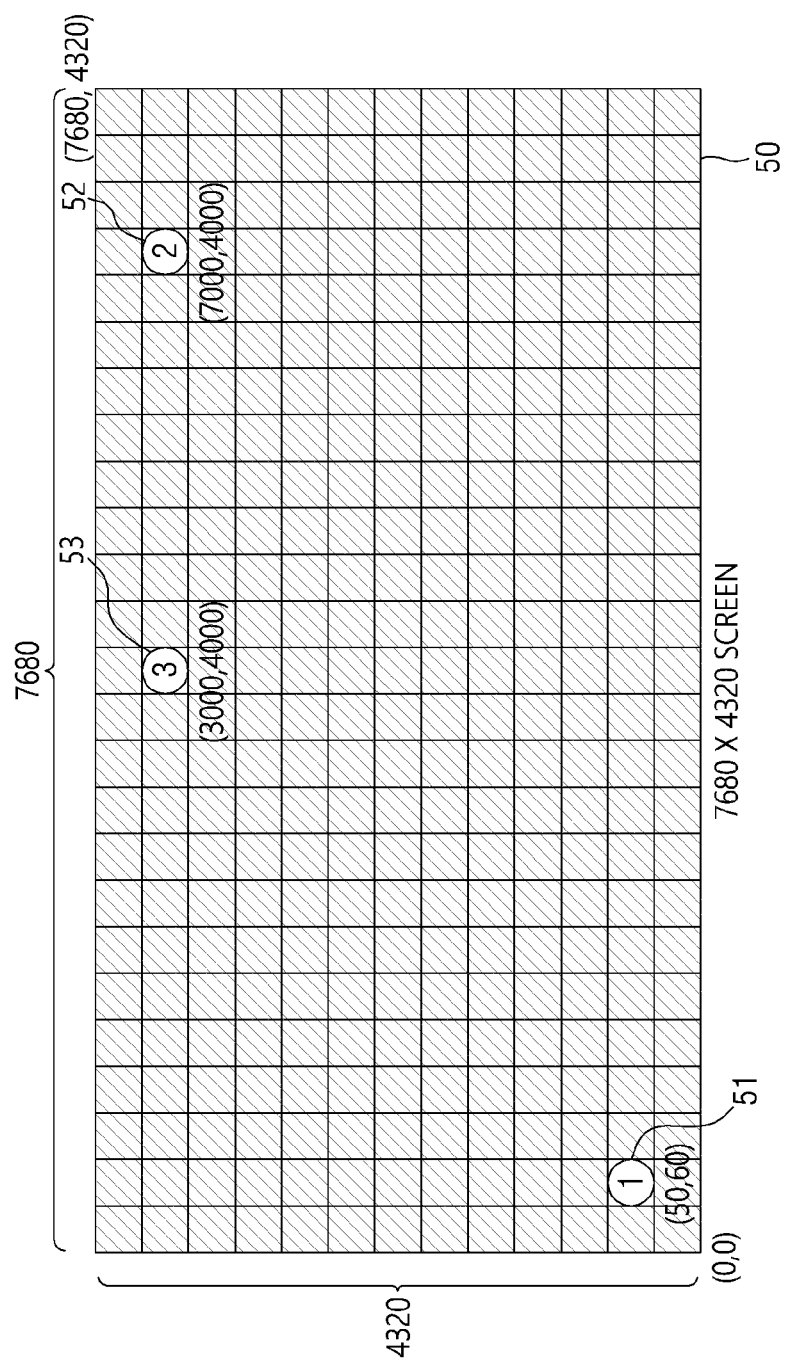
FIG. 6 is a diagram describing an embodiment, in which an image photographing method according to the disclosure is applied in units of pixels.

FIG. 6 is a diagram illustrating an embodiment, in which an image photographing method according to the disclosure is applied in units of pixels.

When the above embodiments are to perform multi-focus photographing on areas separately classified according to the screen division value, the embodiment of FIG. 6 performs multi-focus photographing on pixels of the photographing screen. Therefore, in the embodiment of FIG. 6, since it is sufficient to focus the subject on the basis of each pixel determined by a hardware, a separate screen division value for screen classification may not be required (because it can be seen that the photographing screen is already classified by pixel).

In FIG. 6, the photographing device 100 extracts an order value from the random number information 120 and sequentially focuses each pixel according to the extracted order value to multi-focus photograph multiple images for the same subject.

For example, as in the illustrated example, it is assumed that the number of pixels of the photographing screen is 7680×4320, and the extracted order value is [0, 0, . . . , 3, . . . , 0, 0, . . . , 2, . . . , 0, 0, . . . , 1, . . . , 0, 0]. At this time, the order value '3' matches the pixel of the coordinates (3000, 4000), the order value '2' matches the pixel of the coordinates (7000, 4000), and the order value '1' matches the pixel of the coordinates (50, 60), respectively.

The photographing device 100 photographs the first image by focusing on the pixel of the coordinates (50, 60), in which the order value '1' is set, and then, photographs the second image by focusing on the pixel of the coordinates (7000, 4000), in which the order value '2' is set, and finally photographs the third image by focusing on the pixel of the coordinates (3000, 4000), in which the order value '3' is set, by referring to the extracted order value. The photographed images (first to third images) are packed as a multi-focus image and transmitted to the reading device 200.

The reading device 200 generates random number information 210 in the same manner as in the previous embodiments, and extracts an order value therefrom. And, the reading device 200 verifies the multi-focus image as to whether each pixel is sequentially focused and photographed according to the extracted order value, and reads whether the multi-focus image is a 3-dimensional subject image (realistic image) or a 2-dimensional subject image (forged, altered, processed image) according to the result.

Figure 7:
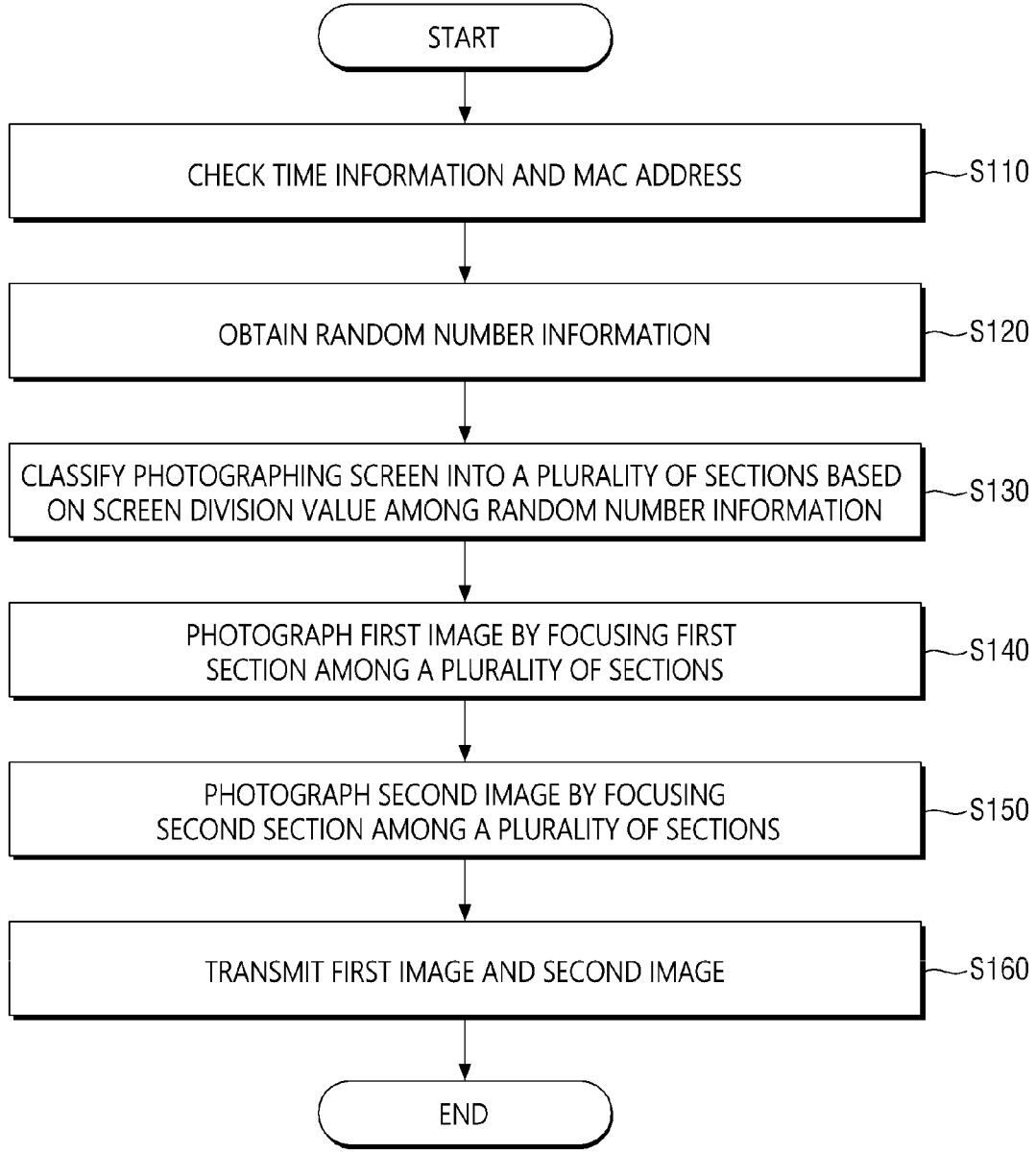
FIG. 7 is a flowchart illustrating an image photographing method according to an embodiment of the disclosure.
Figure 8:
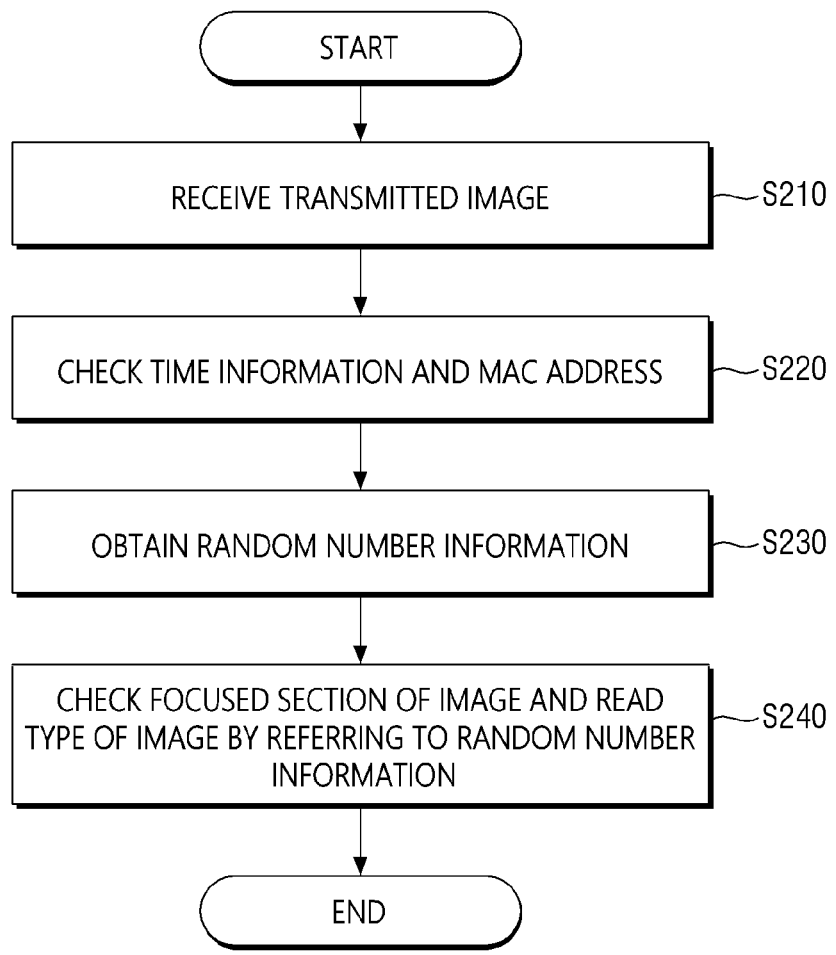
FIG. 8 is a flowchart illustrating an image reading method according to an embodiment of the disclosure.
Figure 9:
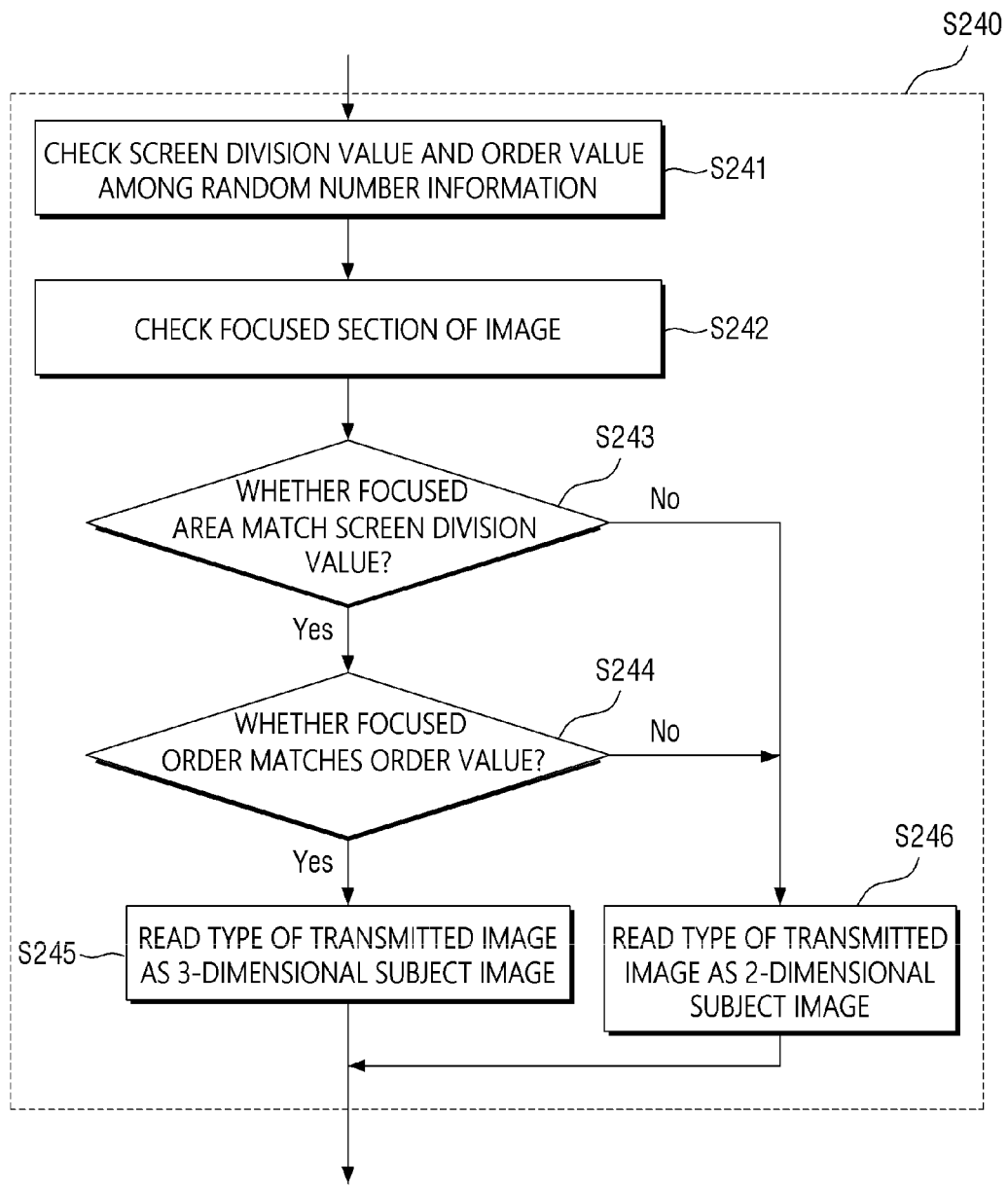
FIG. 9 is a flowchart illustrating an exemplary embodiment, in which the step S240 of determining the type of the image of FIG. 8 is further specified.

FIGS. 7 to 9 illustrate flowcharts of various embodiments according to the disclosure. In order to avoid the complexity of the description, in the following description, 'each area classified according to the screen division value' will be briefly referred to as the term 'section.' Further, in order to avoid overlapping descriptions, repeated descriptions of the same contents as previously described will be omitted as much as possible.

FIG. 7 is a flowchart illustrating an image photographing method according to an exemplary embodiment of the disclosure. The embodiment of FIG. 7 shows a method of photographing a multi-focus image performed by the photographing device 100 illustrated in FIG. 1. Accordingly, when the subject of performing each step is omitted in the embodiment of FIG. 7, it is assumed that the subject of performing the operation is the photographing device 100.

In step S110, the photographing device 100 checks the time information and the MAC address. In this case, the time information may be time information of a clock embedded in the photographing device 100 or may be time information obtained through a network connected to the photographing device 100. The MAC address may be the MAC address of the photographing device 100.

In step S120, the photographing device 100 obtains random number information based on the checked time information and the MAC address. As an embodiment, the photographing device 100 may obtain the random number information by inputting the time information and the MAC address as input information to a predetermined random number generation algorithm.

In this case, the obtained random number information may include a screen division value and an order value for multi-focus photography.

In step S130, the photographing device 100 classifies the photographing screen that illuminates the subject into a plurality of sections based on the screen division value among random number information.

Thereafter, the photographing device 100 sets a focus order of a plurality of sections previously classified based on an order value among random number information, and continuously photographs each section by focusing on each section according to the set focus order.

In step S140, the photographing device 100 photographs a first image by focusing a first section of a plurality of sections having a faster focus order.

In step S150, the photographing device 100 photographs a second image by focusing a second section of the plurality of sections having a slower focus order.

In step S160, the photographing device 100 packs and stores the photographed first image and second image as a multi-focus image. At this time, the time information and the MAC address referenced to obtain the random number information may be packed together. Then, when the photographing device 100 is connected to the reading device 200 through a network, the photographing device 100 transmits the previously stored multi-focus image to the reading device 200.

Thereafter, the reading device 200 verifies whether each section is focused on accordance with the screen division value and the order value for the transmitted multi-focus image, and determines/reads its type.

Meanwhile, in the embodiment of FIG. 7, a case of multi-focus photographing of a plurality of sections is described, but the scope of the disclosure is not limited thereto. For example, it is possible to generate only one image (first image) as a multi-focus image by focusing only one section (first section) among a plurality of sections. In this case, the reading device 200 determines/reads the type of the multi-focus image by checking only whether the focused section of the first image is a photographing section designated by the order value.

FIG. 8 is a flowchart illustrating an image reading method according to an embodiment of the disclosure. The embodiment of FIG. 8 shows a method of reading a multi-focus image performed by the reading device 200 shown in FIG. 1. Accordingly, in the embodiment of FIG. 8, when the subject of performing each step is omitted, it is assumed that the subject of performing the step is the reading device 200.

In step S210, the reading device 200 receives the multi-focus image transmitted from the photographing device 100.

In step S220, the reading device 200 checks the time information and MAC address transmitted together from the photographing device 100.

In step S230, the reading device 200 obtains random number information based on the previously checked time information and MAC address. As an embodiment, the reading device 200 may obtain random number information by inputting the checked time information and MAC address as input information to the same random number generation algorithm as that of the photographing device 100. The obtained random number information may include a screen division value and an order value used for multi-focus photography.

In step S240, the reading device 200 verifies whether the focused sections of the multi-focus image match the screen division value and the order value by referring to the screen division value and the order value of the random number information, and determines/reads the type of the multi-focus image as a 3-dimensional subject image (realistic image) or a 2-dimensional subject image (forged, altered, or processed image).

This will be described in more detail with reference to FIG. 9. FIG. 9 is a flowchart illustrating an exemplary embodiment, in which step S240 of determining/reading the type of the image of FIG. 8 is further specified. It will be described below with reference to the drawing.

In step S241, the reading device 200 checks a screen division value and an order value among random number information.

In step S242, the reading device 200 checks the focused section of each image included in the multi-focus image. For example, when the first to third images are included in the multi-focal image, the reading device 200 checks the focused section of the first image, the focused section of the second image, and the focused section of the third image, respectively.

In step S243, the reading device 200 checks whether the focused area of each image matches the screen division value. When the focused area of each image does not match the screen division value (for example, when two or more of the sections according to the screen division value are simultaneously focused in one image, etc.), the present embodiment proceeds to step S246. Conversely, when the focused area of each image matches the screen division value (for example, when the focused area of each image fits in the section according to the screen division value), the present embodiment proceeds to step S244.

In step S244, the reading device 200 checks whether the focused order of each section matches the order value. When the focused order of each section does not match the order value (for example, a case where the first section is actually focused first and photographed although the order value of the first section is '3,' etc.), the present embodiment proceeds to step S246. Conversely, when the focused order of each section matches the order value (for example, a case where it is sequentially focused and photographed according to the order value set in each section), the present embodiment proceeds to step S245.

In step S245, since it is confirmed that the transmitted multi-focus image has been multi-focus photographed according to the screen division value and the order value, the reading device 200 determines/reads the type of the multi-focus image as a 3-dimensional subject image (or realistic image).

On the other hand, in the case of proceeding from steps S243 and S244 to step S246, since the transmitted multi-focus image is not multi-focus photographed according to the screen division value and the order value, in step S246, the reading device 200 determines/reads the type of multi-focus image as a 2-dimensional subject image (or forged, altered, processed image).

Hereinafter, an exemplary computing device 500 that can implement an apparatus and a system, according to various embodiments of the present disclosure will be described with reference to FIG. 10. For example, the photographing device 100 or the reading device 200 of FIG. 1 may be implemented using the computing device 500 of FIG. 10.

Figure 10:
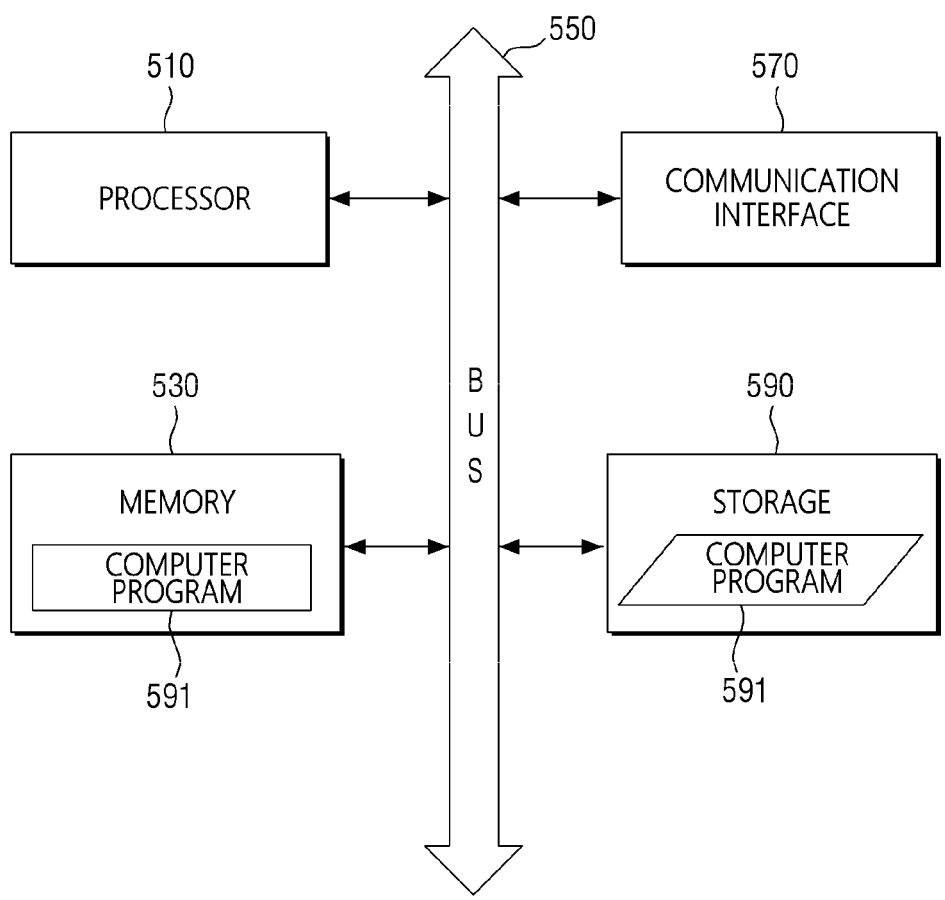
FIG. 10 is a block diagram illustrating an exemplary hardware configuration of a computing device 500, in which various embodiments of the disclosure are implemented.

FIG. 10 is an example hardware diagram illustrating a computing device 500.

As shown in FIG. 10, the computing device 500 may include one or more processors 510, a bus 550, a communication interface 570, a memory 530, which loads a computer program 591 executed by the processors 510, and a storage 590 for storing the computer program 591. However, FIG. 10 illustrates only the components related to the embodiment of the present disclosure. Therefore, it will be appreciated by those skilled in the art that the present disclosure may further include other general purpose components in addition to the components shown in FIG. 10.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to include a communication module well known in the art of the present disclosure.

The storage 590 can non-temporarily store one or more computer programs 591. The storage 590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. For example, the computer program 591 may include instructions for executing operations including obtaining a screen division value for photographing an image, classifying a photographing screen into a plurality of sections based on the screen division value, photographing a first image by focusing a first section among the plurality of sections, photographing a second image by focusing a second section among the plurality of sections, and transmitting the first image and the second image to a server. For another example, the computer program 591 may include instructions for executing operations including receiving a plurality of image for the same object, obtaining a screen division value related to the plurality of image, checking a focused section of the plurality of image based on the screen division value, and determining type of the plurality of image based on a result of checking the focused section.

When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. An apparatus for reading an image comprising:
a processor;
a memory for loading a computer program executed by the processor; and
a storage for storing the computer program,
wherein the computer program includes instructions for executing operations comprising:
receiving a plurality of images for a same subject from a photographing device;
obtaining a screen division value related to the plurality of images;
checking focused sections of the plurality of images based on the obtained screen division value; and
determining type of the plurality of images based on a result of checking the focused sections,
wherein the plurality of images are generated by the photographing device classifying a photographing screen of the same subject into a plurality of sections based on the screen division value, and sequentially photographing according to an order value matching the plurality of sections, and
wherein the screen division value or the order value varies depending on time information and MAC address information of the photographing device.

2. The apparatus of claim 1, wherein the obtaining of the screen division value comprises:
obtaining the time information and the MAC address information of the photographing device; and
generating the screen division value from the obtained time information and the obtained MAC address information using a random number generation algorithm shared with the photographing device.

3. The apparatus of claim 1, wherein the checking of the focused sections of the plurality of images comprises:
obtaining the order value matching the plurality of sections; and
checking the focused sections of the plurality of images by further referring to the obtained order value.

4. The apparatus of claim 1, wherein the determining of the type of the plurality of images comprises:
determining the types of the plurality of images as a 2-dimensional subject image based on a determination that the focused sections do not match the plurality of sections for the photographing screen.

5. The apparatus of claim 1, wherein the determining of the type of the plurality of images comprises:
obtaining the order value matching the plurality of sections; and
determining the types of the plurality of images as a 2-dimensional subject image based on a determination that a focus order of the focused sections does not match the obtained order value.

6. A method for reading an image performed by a computer device, the method comprising:
receiving a plurality of images for a same subject from a photographing device;
obtaining a screen division value related to the plurality of images;
checking focused sections of the plurality of images based on the obtained screen division value; and
determining type of the plurality of images based on a result of checking the focused sections,
wherein the plurality of images are generated by the photographing device classifying a photographing screen of the same subject into a plurality of sections based on the screen division value, and sequentially photographing according to an order value matching the plurality of sections, and wherein the screen division value or the order value varies depending on time information and MAC address information of the photographing device.

7. The method of claim 6, wherein the obtaining of the screen division value comprises:

obtaining the time information and the MAC address information of the photographing device; and generating the screen division value from the obtained time information and the obtained MAC address information using a random number generation algorithm shared with the photographing device.

8. The method of claim 6, wherein the checking the focused sections of the plurality of images comprises:

obtaining the order value matching the plurality of sections; and checking the focused sections of the plurality of images by further referring to the obtained order value.

9. The method of claim 6, wherein the determining the type of the plurality of images comprises:

determining the types of the plurality of images as a 2-dimensional subject image based on a determination that the focused sections do not match the plurality of sections for the photographing screen.

10. The method of claim 6, wherein the determining the type of the plurality of images comprises:

obtaining the order value matching the plurality of sections; and determining the types of the plurality of images as a 2-dimensional subject image based on a determination that a focus order of the focused sections does not match the obtained order value.

* * * * *